United States Patent
Beers et al.

(10) Patent No.: US 10,006,299 B2
(45) Date of Patent: Jun. 26, 2018

(54) TURBINE NOZZLE FOR AIR CYCLE MACHINE

(71) Applicant: Hamilton Sundstrand Corporation, Windsor Locks, CT (US)

(72) Inventors: Craig M. Beers, Wethersfield, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1272 days.

(21) Appl. No.: 13/869,048

(22) Filed: Apr. 24, 2013

(65) Prior Publication Data

US 2014/0321962 A1    Oct. 30, 2014

(51) Int. Cl.
| | |
|---|---|
| *F01D 9/02* | (2006.01) |
| *F01D 5/00* | (2006.01) |
| *F01D 5/14* | (2006.01) |
| *F01D 5/28* | (2006.01) |
| *F01D 9/04* | (2006.01) |
| *F02C 1/02* | (2006.01) |

(52) U.S. Cl.
CPC ............ *F01D 9/02* (2013.01); *F01D 5/005* (2013.01); *F01D 5/141* (2013.01); *F01D 5/288* (2013.01); *F01D 9/045* (2013.01); *F01D 9/048* (2013.01); *F02C 1/02* (2013.01); *F05D 2230/80* (2013.01)

(58) Field of Classification Search
CPC .......... F01D 5/005; F01D 5/141; F01D 5/147; F01D 5/288; F01D 9/041; F01D 9/045; F01D 9/048; F01D 17/141; F05D 2230/80; F05D 2230/90; F05D 2240/128; F05D 2240/226; F05D 2240/95; F02C 1/02

See application file for complete search history.

(56) References Cited

U.S. PATENT DOCUMENTS

| | | | |
|---|---|---|---|
| 3,972,644 A | 8/1976 | Johnson | |
| 4,726,101 A | 2/1988 | Draghi et al. | |
| 4,798,515 A | 1/1989 | Hsia et al. | |
| 5,142,778 A * | 9/1992 | Smolinski | B23K 26/00 219/121.66 |
| 5,249,934 A * | 10/1993 | Merritt | F04D 29/5853 417/406 |
| 5,299,909 A | 4/1994 | Wulf | |
| 5,309,735 A | 5/1994 | Maher, Jr. et al. | |
| 5,311,749 A * | 5/1994 | McAuliffe | F02C 3/32 415/12 |
| 5,460,003 A * | 10/1995 | Nenov | F01D 9/045 415/186 |

(Continued)

FOREIGN PATENT DOCUMENTS

| | | |
|---|---|---|
| CN | 203292697 U | 11/2013 |
| JP | H04292502 A | 10/1992 |

(Continued)

*Primary Examiner* — Ninh H Nguyen

(74) *Attorney, Agent, or Firm* — Carlson, Gaskey & Olds, P.C.

(57) ABSTRACT

A nozzle for use in an air cycle machine has a plate. A plurality of vanes extend away from the plate. The plurality of vanes extend for a height away from the plate. A width is defined as the closest distance between two adjacent vanes. A ratio of the height to the width is between 3.253 and 3.800. An air cycle machine and a method of repair are also disclosed.

6 Claims, 2 Drawing Sheets

(56) References Cited

U.S. PATENT DOCUMENTS

| | | | |
|---|---|---|---|
| 5,522,134 A * | 6/1996 | Rowe | B23P 6/005 |
| | | | 29/402.08 |
| 5,630,700 A | 5/1997 | Olsen et al. | |
| 6,109,867 A | 8/2000 | Portefaix | |
| 6,789,315 B2 * | 9/2004 | Marques | B23P 6/002 |
| | | | 228/119 |
| 6,942,183 B2 | 9/2005 | Zywiak | |
| 7,322,202 B2 | 1/2008 | Zywiak et al. | |
| 7,779,644 B2 | 8/2010 | Decrissantis et al. | |
| 8,016,551 B2 * | 9/2011 | Lin | F01D 9/045 |
| | | | 415/163 |
| 8,113,787 B2 * | 2/2012 | Barril | F01D 5/288 |
| | | | 416/224 |
| 8,347,647 B2 | 1/2013 | McAuliffe | |
| 2003/0177640 A1 | 9/2003 | Marques et al. | |
| 2012/0156028 A1 * | 6/2012 | Colson | F01D 25/28 |
| | | | 415/208.2 |

FOREIGN PATENT DOCUMENTS

| JP | 2004263679 A | 9/2004 |
|---|---|---|
| JP | 3910648 B2 | 4/2007 |

* cited by examiner

TURBINE NOZZLE FOR AIR CYCLE MACHINE

BACKGROUND

This application relates to a turbine nozzle for use in an air cycle machine.

Air cycle machines are known and, typically, include one or more turbines which receive a compressed air source, and are driven to rotate. The turbines, in turn, rotate a compressor rotor. Air is conditioned by the air cycle machine and moved for use in an aircraft cabin air conditioning and temperature control system.

The turbines are typically provided with nozzle which controls the flow of air upstream of a turbine rotor.

SUMMARY

A nozzle for use in an air cycle machine has a plate. A plurality of vanes extend for a height away from the plate. A width is defined as the closest distance between two adjacent vanes. A ratio of the height to the width is between 3.253 and 3.800. An air cycle machine and a method of repair are also disclosed.

These and other features may be best understood from the following drawings and specification.

DETAILED DESCRIPTION

Figure 1:
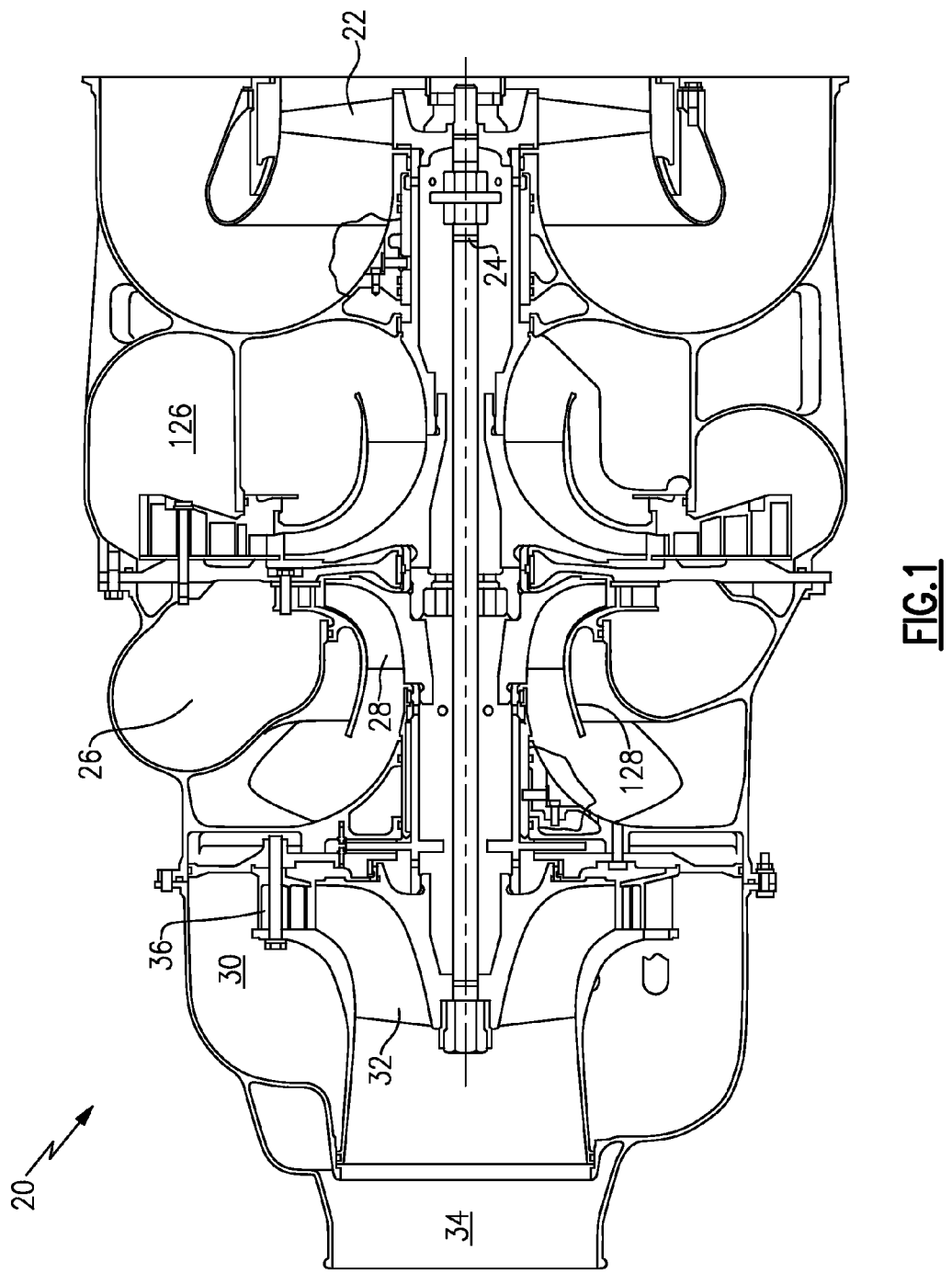
FIG. 1 shows an air cycle machine.

An air cycle machine 20 is illustrated in FIG. 1 having a fan 22 being driven by a shaft 24. As known, a compressor rotor 35 28 receives compressed air from a compressed air source at an inlet 126 and is driven to rotate to further compress the air. The air passes downstream to a first stage turbine inlet 26 which drives a first turbine rotor stage 28. The air then passes to an inlet 30 of a second turbine rotor stage 32 and then to outlet 34. Air from outlet 34 passes for use in an aircraft cabin and as part of a cabin air conditioning and temperature control system.

A turbine nozzle 36 is associated with the second stage turbine rotor and serves to direct airflow from the inlet to the turbine rotor 32.

A first stage shroud and nozzle 127 includes a shroud 128 extending to a location downstream of the rotor 28 and a nozzle 130 upstream of the rotor 28.

Figure 2A:
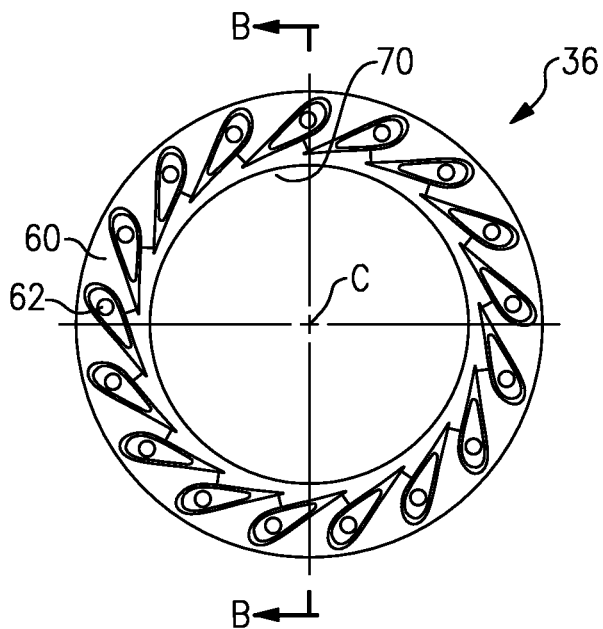
FIG. 2A shows a turbine nozzle associated with a second stage turbine rotor.

FIG. 2A shows the nozzle 36 associated with the second stage rotor 32. As shown, the nozzle 36 has a plate 60 with a plurality of circumferentially spaced vanes 62 extending away from the plate 60. An inner bore 70 is illustrated and is centered on a center axis C.

Figure 2B:
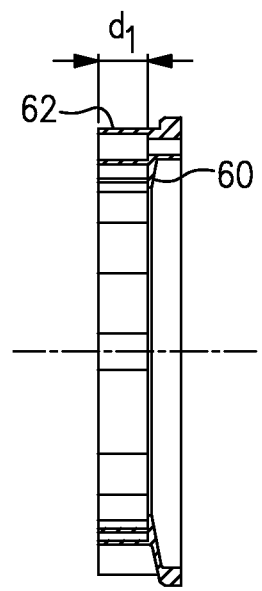
FIG. 2B is a cross-section along line B-B of FIG. 2A.

FIG. 2B is a cross-sectional view along B-B of FIG. 2A. As shown, the nozzle 36 has the vanes 62 extending in an axial direction for a distance $d_1$ away from the plate 60.

Figure 2C:
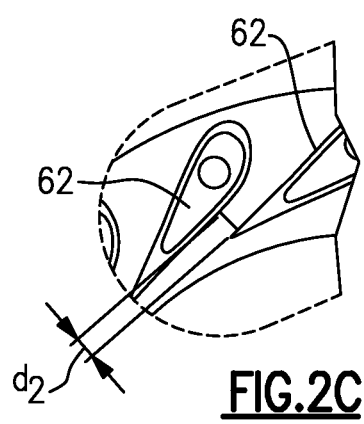
FIG. 2C is an enlarged view of a portion of the nozzle.

As shown in FIG. 2C, a distance $d_2$ can be defined between adjacent ones of the vane 62 and is the shortest distance between the two vanes. This distance is known as passage width.

As shown in FIGS. 2A-C, there are 17 nozzle vanes in this embodiment. In one embodiment, the $d_1$ distance is known as a passage height and is 1.11 inch (2.8194 centimeters). The nozzle width $d_2$ was 0.316 inch (0.80264 centimeters). The width $d_2$ is the closest distance between two adjacent vanes 62, measured parallel, or tangent to the airfoil shapes of the vanes 62. The total flow area between the 17 vanes was 5.963 square inches (38.47 centimeters).

In embodiments, a ratio of the passage height $d_1$ to the passage width $d_2$ was between 3.253 and 3.800. The total flow area ranged between 5.508 and 6.434.

The nozzle 36 has a tungsten carbide erosion coating. The nozzle 36 is formed of a base of aluminium and then provided with a tungsten carbide erosion coating. Preferably, a high velocity oxy fuel coating technique is provided utilizing continuous burning.

A method of repairing air cycle machine 20 includes the steps of removing a nozzle 36 from a location adjacent a second stage turbine rotor 32. A replacement nozzle 36 is then mounted adjacent rotor 32.

Details of the nozzle and shroud 127 are disclosed and claimed in co-pending application Ser. No. 13/896,045, entitled Turbine Nozzle and Shroud, and filed on even date herewith.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A nozzle for use in an air cycle machine comprising:
   a plate;
   a plurality of vanes extending away from said plate, with said plurality of vanes extending for a height away from said plate and a width being defined as the closest distance between two adjacent vanes, with a ratio of said height to said width being between 3.253 and 3.800;
   wherein there are 17 circumferentially spaced ones of said vanes; and
   wherein a total flow area is defined between all 17 of said vanes and said total flow area being between 5.508 and 6.434 square inches (35.535-41.509 square centimeters).

2. The nozzle as set forth in claim 1, wherein said plate is formed of a base aluminum material provided with a tungsten carbide erosion coating.

3. An air cycle machine comprising:
   a first stage turbine rotor and a second stage turbine rotor, said first and second stage turbine rotors being configured to drive a shaft, and a compressor rotor driven by said shaft, and a fan rotor driven by said shaft;
   a nozzle combination provided adjacent said second stage turbine rotor with said nozzle being at a location upstream of said second stage turbine rotor;
   the nozzle including a plurality of vanes extending in an axial direction away from a plate, with said plurality of vanes extending for a height away from said plate and a width being defined as the closest distance between two adjacent vanes, with a ratio of said height to said width being between 3.253 and 3.800;
   wherein there are 17 circumferentially spaced ones of said vanes; and
   wherein a total flow area is defined between all 17 of said vanes and said total flow area being between 5.508 and 6.434 square inches (35.535-41.509 square centimeters).

4. The air cycle machine as set forth in claim 3, wherein said plate is formed of a base aluminum material provided with a tungsten carbide erosion coating.

5. A method of repairing an air cycle machine comprising the steps of:
   (a) removing a nozzle from a location adjacent a second stage turbine rotor in an air cycle machine, and replacing said removed nozzle with a replacement nozzle; and
   (b) the replacement nozzle including a plate, and a plurality of vanes extending away from said plate, with said plurality of vanes extending for a height away from said plate and a width being defined as the closest distance between two adjacent vanes, with a ratio of said height to said width being between 3.253 and 3.800;
   wherein there are 17 circumferentially spaced ones of said vanes; and
   wherein a total flow area is defined between all 17 of said vanes and said total flow area being between 5.508 and 6.434 square inches (35.535-41.509 square centimeters).

6. The method as set forth in claim 5, wherein said plate is formed of a base aluminum material provided with a tungsten carbide erosion coating.

* * * * *